(12) United States Patent
Collot et al.

(10) Patent No.: US 6,270,241 B1
(45) Date of Patent: Aug. 7, 2001

(54) UNIT COMPRISING AT LEAST ONE HEADLIGHT AND AT LEAST ONE INDICATOR LIGHT, FOR A MOTOR VEHICLE

(75) Inventors: Patrice Collot, Pantin; Jose Ordonez, Creteil; Vincent Godbillon, Paris; Jean Rit, La Varenne St Hilaire, all of (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 09/256,606

(22) Filed: Feb. 23, 1999

(30) Foreign Application Priority Data

Feb. 23, 1998 (FR) .................................................. 98 02131

(51) Int. Cl.$^7$ .............................. F21V 29/00; B60Q 1/02
(52) U.S. Cl. .......................... 362/544; 362/507; 362/517
(58) Field of Search .................................... 362/507, 538, 362/543, 544, 298, 299, 300, 498, 499, 542, 517, 546

(56) References Cited

U.S. PATENT DOCUMENTS

| | | | |
|---|---|---|---|
| 1,300,202 | * 4/1919 | Stubblefield | 362/346 |
| 4,198,674 | 4/1980 | Ihage et al. | 362/544 |
| 4,912,606 | 3/1990 | Yamamoto | 362/518 |
| 5,124,891 | * 6/1992 | Blusseau | 362/517 |
| 5,172,972 | * 12/1992 | Terao | 362/517 |
| 5,546,284 | * 8/1996 | Harada | 362/487 |
| 5,605,392 | * 2/1997 | Daumueller | 362/546 |
| 5,833,345 | * 11/1998 | Ito | 362/507 |

FOREIGN PATENT DOCUMENTS

| | | |
|---|---|---|
| 1 101 984 | 3/1961 | (DE) . |
| 195 41 509 | 5/1995 | (DE) . |

* cited by examiner

Primary Examiner—Alan Cariaso
Assistant Examiner—Hargobind S. Sawhney
(74) Attorney, Agent, or Firm—Morgan & Finnegan, LLP

(57) ABSTRACT

In an assembly of at least one headlight and an indicator light for a motor vehicle, the headlight includes a lamp which is mounted in a reflector, and the indicator light, which is situated adjacent to the headlight, includes a lamp and reflective means for flux recuperation. The headlight and the indicator light also have adjacent lenses. The reflective means comprise a first reflector cooperating with the lamp of the indicator light, and a second reflector, the lamp and the first reflector of the indicator light being disposed behind the reflector of the headlight, and the second reflector of the indicator light is disposed in line with the lens of the indicator light.

18 Claims, 2 Drawing Sheets

UNIT COMPRISING AT LEAST ONE HEADLIGHT AND AT LEAST ONE INDICATOR LIGHT, FOR A MOTOR VEHICLE

FIELD OF THE INVENTION

The present invention relates in general terms to headlights for motor vehicles, and more particularly to headlights associated with front indicator lights, such as flashing direction indicator lights or position lights.

BACKGROUND OF THE INVENTION

A unit consisting of a headlight or headlights and an indicator light conventionally includes at least one headlight having a reflector, together with an indicator light which, in particular in order to satisfy industry regulations, includes a flux recuperating reflector which is situated in line with the light output zone of the indicator light, and in which a lamp is received.

Such a headlight/indicator light unit has the drawback that the axial dimension of the indicator light is large, and sometimes comparable with that of the headlight or headlights where these have a smaller lamp and reflector.

Another disadvantage of these known units lies in the fact that the lamp which is present in line with the light output window in the base of the cavity of the indicator light is in general visible from outside, and this makes it difficult to obtain a homogeneous appearance for the unit, which may be formed as a single block or in two parts corresponding to the headlight or headlights and to the indicator light.

DISCUSSION OF THE INVENTION

The present invention aims to overcome these drawbacks in the state of the art.

A further object of the present invention is to propose a unit comprising at least one headlight and an indicator light, which can more easily and more flexibly be integrated into the front space of the vehicle, with, if necessary, easier access and simplified electric wiring for the lamp of the indicator light.

Finally, other objects of the present invention are, especially, to reduce the number of cover pieces for giving access to the lamps, and to generate more easily a part of the indicating light beam which is directed sideways.

Accordingly, the present invention proposes a unit comprising at least one headlight and an indicator light for a motor vehicle, the headlight comprising a lamp mounted within a reflector, and the indicator light, situated adjacent to the headlight, comprising a lamp and reflective means for flux recuperation, the headlight and the indicator light including adjacent lenses, characterised in that the reflective means include a first reflector cooperating with the lamp of the indicator light, and a second reflector, in that the lamp and the first reflector of the indicator light are disposed behind the reflector of the headlight, and in that the second reflector of the indicator light is disposed in line with the lens of the indicator light.

Preferred, but not limiting, aspects of the unit comprising a headlight or headlights and an indicator light in accordance with the invention are as follows:

- the headlight and the indicator light are mounted in a common housing and share a common lens.
- the housing has a common aperture closed by a removable cover piece, for giving access both to the lamp of the headlight and to the lamp of the indicator light.
- the indicator light is disposed between two headlights of the unit.
- the indicator light includes at least one optical plate mounted in an aperture of an embellisher of the headlights.
- the headlight and the indicator light are mounted in two distinct housings attached to each other.
- the indicator light is disposed outboard of the headlight, in a wing return region of the vehicle.
- the lens of the indicator light covers a front region and a side region of the said indicator light, and the lamp and the first reflector of the indicator light are adapted to generate by themselves a portion of the indicating light beam which is directed laterally towards the outside.
- the first reflector of the indicator light is of the ellipsoidal kind, with a first focus in the vicinity of which a filament of the lamp is situated, and a second focus which is disposed generally laterally with respect to the first focus, and the second reflector of the indicator light is of the parabolic kind, with its focus being situated close to the second focus of the first reflector.
- the unit further includes an opaque mask having a window arranged close to the said second focus.

Further aspects, objects and advantages of the present invention will appear more clearly on a reading of the following detailed description of preferred embodiments of the latter, given by way of example and made with reference to the attached drawings.

DESCRIPTION OF PREFERRED EMBODIMENTS OF THE INVENTION

Figure 1:
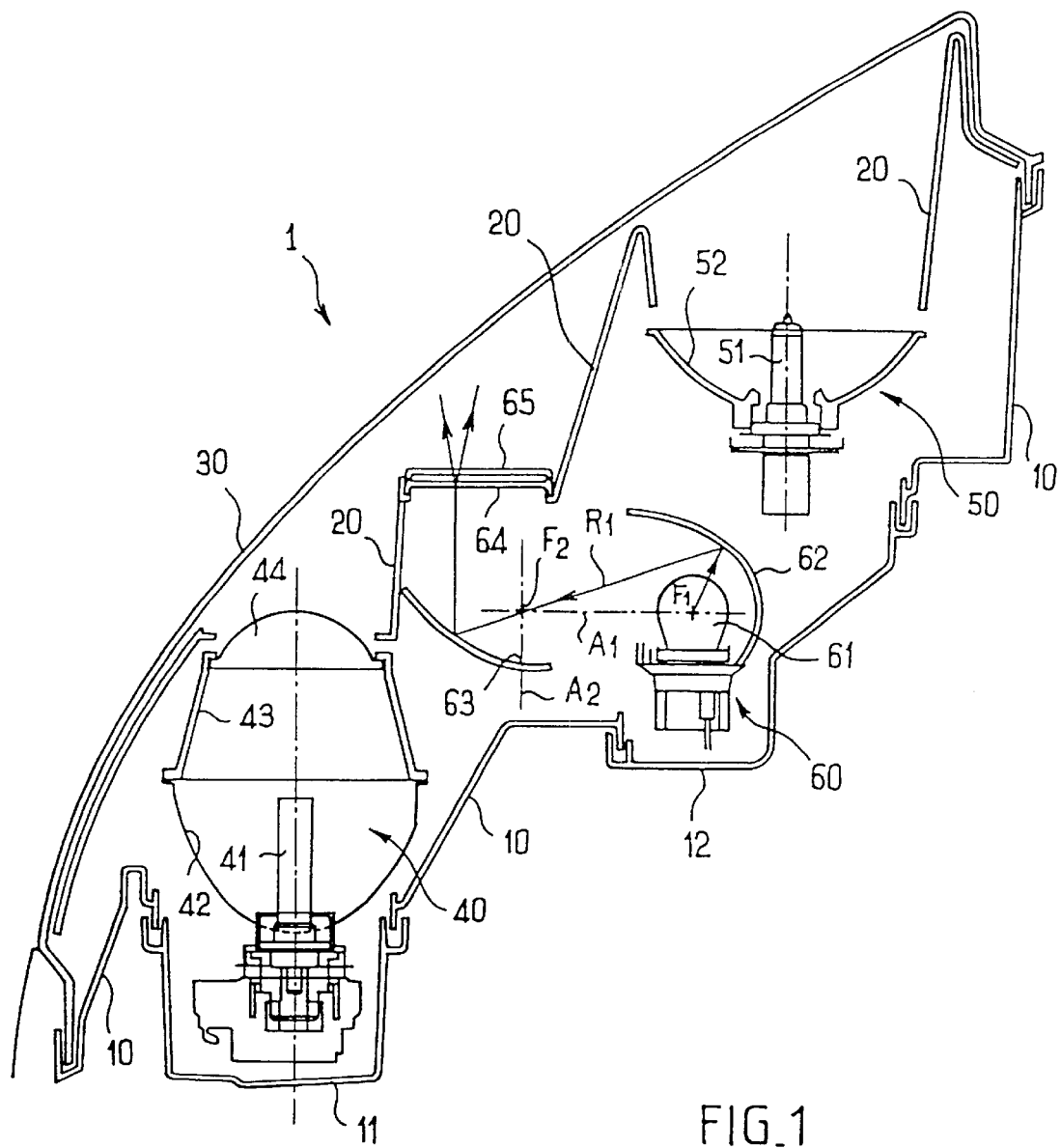
FIGS. 1 and 2 are views in horizontal cross section of two units having headlights and indicator lights, in two embodiments of the invention.

With reference first to FIG. 1, this shows a unit, generally designated by the reference 1, which includes headlights and indicator lights and which comprises a single housing 10 closed at the front by a lens 30 and enclosing two headlights 40 and 50 and an indicator light 60, such as a flashing indicator.

The headlight 40 is preferably a dipped beam headlight of the elliptical kind, of a type which may be conventional, with a lamp 41 mounted inside a reflector 42 of the ellipsoidal type and a lens 44 which is fixed on a mounting 43, which is itself fixed to the reflector 42.

The headlight 50 is preferably a long range headlight which is again conventional, with a lamp 51 and a reflector 52 preferably of the paraboloidal kind.

Each of the headlights emits a beam through a respective zone of the lens 30.

In this embodiment, the indicator light 60 is mounted between the two headlights 40 and 50. It includes a lamp 61, a first reflector 62, a second mirror 63 and two optical plates 64, 65 which are essentially superimposed on each other. It will be observed here that an embellisher or mask 20, which is arranged to give to the headlight and indicating light unit an appearance of reflected light which is relatively homogeneous when the lamps are extinguished (being typically a metallised component), provides mounting for the optical plates 64 and 65 in an aperture defined in the said embellisher 20.

The first reflector 62 is a reflector of the ellipsoidal type with two foci F1 and F2, the major axis A1 of which extends horizontally and essentially transversely to the optical axes of the headlights, while the second reflector 63 is part of a paraboloid of revolution, the axis A2 of which is essentially parallel to the optical axes of the two headlights 40 and 50, with its focus being situated on or close to the second focus F2 of the first reflector 62.

The lamp 61 is positioned in such a way that its filament is close to the first focus F1 of the first reflector 62.

It will be understood that the combination of the reflectors 62 and 63 produces, downstream of the reflector 63, a light beam which is essentially parallel to the axis A2 and which will form the required indicating light beam after having passed through the optical plates 64 and 65.

Preferably the plates 64 and 65, in a manner known, produce from the incident beam a beam coloured amber, which is suitably spread in width and height, and they are also so designed as to offer an outside appearance which is essentially uncoloured when the indicator light function is extinguished. Such optical plates are well known, and will not be described in detail.

According to a preferred feature of the invention, the lamp 61 and the first reflector 62 of the indicator light are situated generally behind the reflector 52 of the adjacent long range headlight. Several advantages result from this.

First of all, the lamp 61 being offset laterally with respect to the exit window through which light leaves the indicator light and which is constituted by the plates 64 and 65, the lamp is essentially invisible from outside when the indicator light is extinguished. This results in increased homogeneity in the appearance of the indicator light, and more generally of the headlight and indicator light unit when all the lighting functions are extinguished and when it is observed from a viewpoint in front of the vehicle.

In addition, the axial dimension of the indicator light is reduced since the axial bulk of the lamp 61 can be shifted sideways, in this case to a position behind the reflector 52 of the headlight 50. As a result, it is made very much easier to incorporate the lighting unit in the front space of the vehicle, which is becoming more and more reduced in size and crowded in modern motor cars with plunging bonnets at the front.

Finally, one advantage of this arrangement lies in the fact that a single cover piece, designated by the reference numeral 12, can be used for giving access both to the lamp 51 of the headlight 50 and to the lamp 61 of the indicator light, for lamp replacement purposes.

Figure 2:
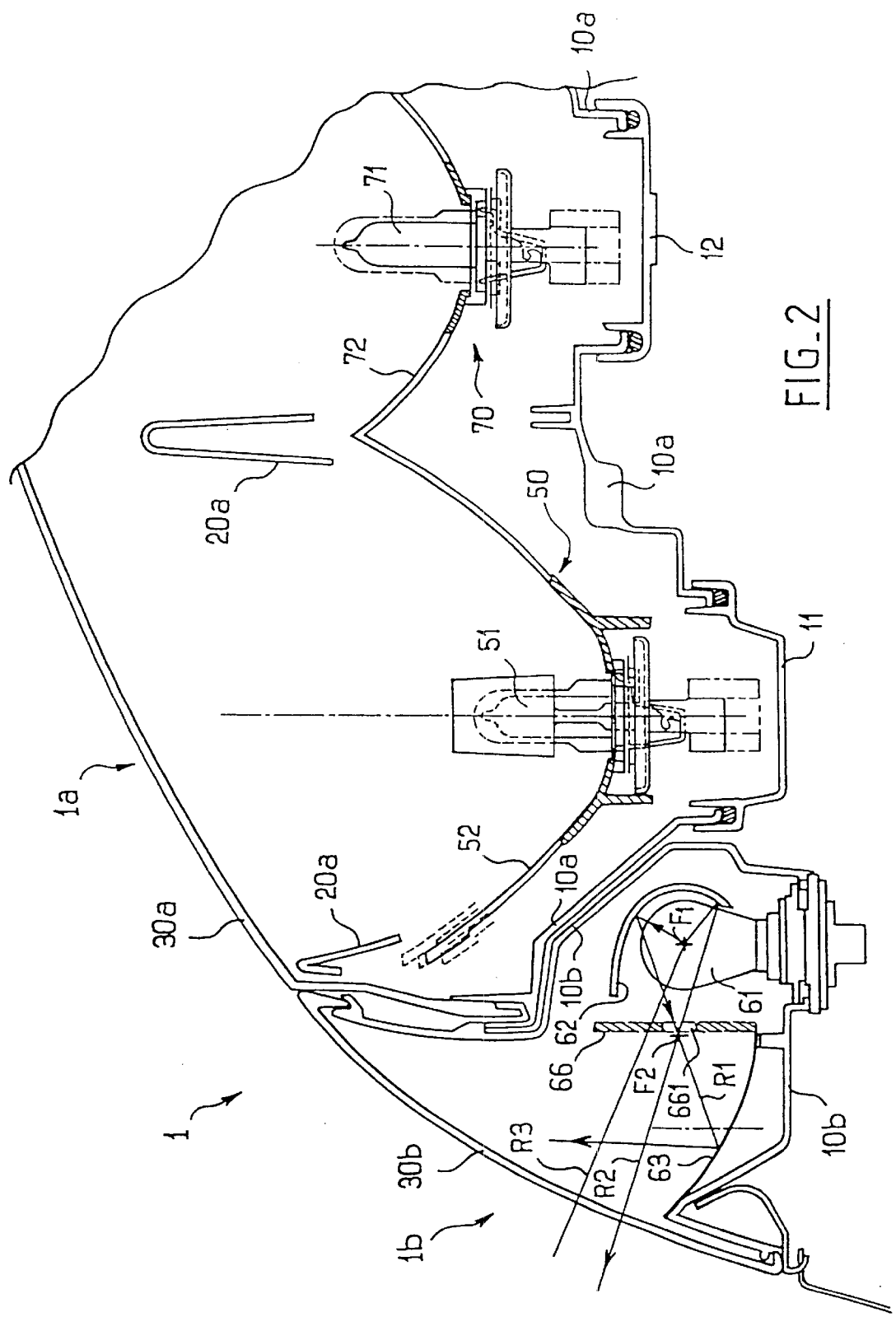

With reference now to FIG. 2, this shows a headlight unit 1a and indicator light unit 1b which is distinguished essentially from that in FIG. 1 by the fact that it consists of two units, one of which, 1a, encloses two headlights 50 and 70, while the other one, 1b, encloses a flashing direction indicator light.

The unit 1a comprises a housing 10a, a lens 30a, an embellisher 20a, and the two headlights 50 and 70 consisting respectively of a lamp 51, 71 and a reflector 52, 72 which is of the parabolic kind or which has a surface that generates a cut-off beam by itself. Cover pieces 11 and 12 provide access to the lamps for replacement purposes.

The unit 1b is situated essentially beside, and on the outboard side with respect to, the unit 1a, and it encloses the flashing indicator light. Here again, this light comprises a lamp 61, a first reflector 62 and a second reflector 63 similar to those in the embodiment of FIG. 1, which are mounted within a specific housing 10b closed by a specific lens 30b which is preferably uncoloured and which lies as an extension of the lens 30a, with a curve such as is shown and which is such as to embrace the rounded left front corner region of the vehicle. In this example, the lens 30b includes rounded elements which are spherical or perhaps toroidal, for lateral and vertical diffusion of the light.

Here again, the arrangement of the lamp 61 and the first and second reflectors 62 and 63 has several advantages. First of all, the assembly is more compact than in arrangements in the prior art, to the extent that the lamp 61, which is situated here again behind a reflector of a headlight, in this example the reflector 52, is mounted in a part of the housing 10b which occupies a free space behind the housing 10a of the headlight unit.

In addition, the axial bulk of the indicator light, which is in a position substantially behind the headlights with respect to the front of the vehicle, in a position for which vehicle manufacturers generally want minimum occupation of space, is reduced, without however involving any prejudice to its aperture, especially at the side. Thus it can be seen in FIG. 2 that, in practice, the indicator light only extends beyond the headlights themselves in a backward direction.

In addition, the lamp is masked when the vehicle is seen from the front. In that connection, even if the amber colour of the flashing indicator function is given by the globe of the lamp 61, the assembly of headlights and indicator light will retain an essentially uncoloured appearance when the lighting functions are extinguished.

Another specific advantage of this form of embodiment lies in the fact that part of the light beam reflected by the first reflector 62 (see for example the ray R2), added to the direct radiation from the lamp (ray R3), will be able to generate directly a lateral portion of the beam having a substantial luminous intensity, so as thereby to satisfy more easily the regulations regarding flashing indicator lights for indicating change of direction.

Finally, this second embodiment of the invention is of advantage in that access to the lamp for its replacement is facilitated. In this connection, it is generally more difficult to gain access to the headlight/indicator light unit, the nearer it is to the wing of the vehicle. The lamp in this example is offset at a substantial distance from the wing, so that it is easier to gain access to it. It follows that its electric wiring, which does not have to pass around the sheet metal components conventionally arranged in this region of the vehicle, is simplified.

The present invention is of course in no way limited to the embodiments described and shown, but the person skilled in the art will be able to apply to it any variation or modification within its spirit.

In particular, the particular features of the indicator light in the first embodiment may be used in the second one, and vice versa.

In addition, the combination of a reflector 62 of the elliptical kind and a reflector 63 of the parabolic kind may be replaced by any other combination which enables the same type of arrangement to be achieved within the space, and in particular by the combination of a parabolic reflector and a planar reflector.

In addition, the axis of the first reflector 62 may take any desired orientation, given that it is substantially inclined with respect to the mean axis of emission of the indicator light.

In addition, it can be arranged that the dispersion of the indicator light beam produced by the indicator light will be ensured not by the optical plates 64, 65 or by the lens 30b itself, but by arrangements such as striations, facets etc. formed on the reflective surface of the first reflector 62 and/or the second reflector 63.

In addition, the indicator light may be arranged in such a way that the lamp 61 is mounted in the first reflector 62, either parallel to the longitudinal axis of the vehicle or in any other direction.

It will be observed in addition that, in order to improve the masking effect, it is possible to arrange between the first reflector 62 and the second reflector 63 an opaque screen 66, indicated in broken lines in FIG. 2 and, this screen 66 having a window 661 of limited size which allows light rays concentric about the focus F2 to pass through it.

Finally, from the mechanical point of view it is possible to arrange to afix the second reflector 63 of the indicator light to the embellisher 20 of the headlight (especially in the context of FIG. 1). It can also be arranged that the lamp 61 and the first reflector 62 constitute together a removable module (with a view to replacing the lamp), mounted for example by clipping on the housing 10 or 10b.

What is claimed is:

1. An assembly for mounting in a motor vehicle, comprising:
   at least one headlight unit and
   an indicator light unit,
   the headlight unit comprising a first reflector, the headlight unit further enclosing a headlight lamp mounted within the first reflector, and
   the indicator light unit, situated adjacent to the headlight unit, comprising reflective means for flux recuperation, the indicator light unit further enclosing an indicator lamp;
   the headlight unit and the indicator light unit further including adjacent lenses,
   wherein the reflective means includes a second reflector cooperating with the indicator lamp and a third reflector,
   wherein the indicator lamp and the second reflector are mounted directly behind the first reflector to render the indicator lamp invisible through the lens; and the third reflector is disposed in line with the lens of the indicator light unit.

2. The assembly according to claim 1, wherein the headlight unit and the indicator light unit are mounted in a common housing and share a common lens.

3. The assembly according to claim 2, wherein the housing has a common aperture closed by a removable cover piece, for giving access both to the headlight lamp and to the indicator lamp.

4. The assembly according to one of claim 1, wherein the indicator light unit is disposed between two headlight units of the assembly.

5. The assembly according to claim 4, wherein the indicator light unit includes at least one optical plate mounted in an aperture of an embellisher disposed in the assembly.

6. The assembly according to claim 1, wherein the headlight unit and the indicator light unit are mounted in two distinct housings attached to each other.

7. The assembly according to claim 6, wherein the indicator light unit is disposed outboard of the headlight unit, in a wing return region of the vehicle.

8. The assembly according to claim 7, wherein the lens of the indicator light unit covers a front region and a side region of the indicator light, and the indicator lamp and the second reflector are adapted to generate by themselves a portion of the indicating light beam which is directed laterally towards the outside.

9. The assembly according to one of claim 1, wherein the second reflector is substantially ellipsoidal and having a first focus disposed substantially near a filament of the indicator lamp and a second focus disposed substantially lateral to the first focus, and the third reflector is substantially parabolic with a third focus disposed substantially near the second focus of the second reflector.

10. The assembly according to claim 9, further including an opaque mask having a window disposed substantially near the second focus.

11. The assembly of claim 1 further comprising the indicator lamp.

12. The assembly of claim 1 further comprising at least one headlight lamp.

13. A motor vehicle comprising the assembly of claim 1.

14. An assembly for mounting in a motor vehicle, comprising:
   at least two headlight units and
   an indicator light unit disposed between the headlight units,
   the headlight unit comprising a first reflector, the headlight unit further enclosing a headlight lamp mounted within the first reflector, and
   the indicator light unit, situated adjacent to the headlight unit, comprising reflective means for flux recuperation, the indicator light unit further enclosing an indicator lamp;
   the headlight unit and the indicator light unit further including adjacent lenses,
   wherein the reflective means includes a second reflector cooperating with the indicator lamp and a third reflector,
   wherein the indicator lamp and the second reflector are mounted behind the first reflector to render the indicator lamp invisible through the lens; and the third reflector is disposed in line with the lens of the indicator light unit.

15. The assembly according to claim 14, wherein the indicator light unit includes at least one optical plate mounted in an aperture of an embellisher disposed in the assembly.

16. A unit comprising:
   an indicator comprising (1) an indicator lamp (2) a first reflector (3) a second reflector and (4) a pair of optical plates, and the second reflector is disposed relative to the first reflector and the lamp to produce an indicator light beam through the optical plates; and
   at least one headlamp adapted to emit a headlamp light beam along an axial direction, the headlamp being disposed to shield the indicator lamp and the first reflector from view in the axial direction.

17. The unit of claim 16, wherein the unit further comprises a mask adapted to, with the first and second reflectors and the optical plates, to shield the indicator from view in the axial direction.

18. The unit of claim 16, wherein the indicator lamp and the first reflector are disposed behind the headlamp reflector of the headlamp in the axial direction.

* * * * *